(12) United States Patent
Paulraj et al.

(10) Patent No.: US 12,488,151 B2
(45) Date of Patent: Dec. 2, 2025

(54) MULTI-MODE VALIDATION OF MODIFICATIONS TO AN IHS

(71) Applicant: Dell Products, L.P., Round Rock, TX (US)

(72) Inventors: Deepaganesh Paulraj, Bangalore (IN); Nishaa Bouvanasilan, Bangalore (IN); Kalyani Korubilli, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 103 days.

(21) Appl. No.: 18/472,339

(22) Filed: Sep. 22, 2023

(65) Prior Publication Data

US 2025/0103756 A1   Mar. 27, 2025

(51) Int. Cl.
*G06F 21/78* (2013.01)
*G06F 21/33* (2013.01)

(52) U.S. Cl.
CPC .............. *G06F 21/78* (2013.01); *G06F 21/33* (2013.01)

(58) Field of Classification Search
CPC ................................ G06F 21/78; G06F 21/33
USPC ......................................................... 713/193
See application file for complete search history.

(56) References Cited

U.S. PATENT DOCUMENTS

| | | | |
|---|---|---|---|
| 7,096,282 B1* | 8/2006 | Wille | G06Q 20/3552 710/16 |
| 9,535,676 B1* | 1/2017 | Forehand | G06F 21/629 |
| 10,311,224 B1* | 6/2019 | Farhan | H04L 9/0897 |
| 11,397,823 B1* | 7/2022 | Argenti | G06F 21/64 |
| 2011/0151836 A1* | 6/2011 | Dadu | G06F 21/335 713/176 |
| 2012/0204269 A1* | 8/2012 | Gardner | G06F 21/1075 726/26 |
| 2012/0303952 A1* | 11/2012 | Smith | H04L 63/0876 713/158 |
| 2013/0185197 A1* | 7/2013 | Brown | G06F 21/105 705/39 |
| 2014/0358792 A1* | 12/2014 | Berke | G06Q 30/018 705/50 |
| 2015/0161618 A1* | 6/2015 | Angus | G06F 8/60 705/317 |
| 2015/0317151 A1* | 11/2015 | Falcy | H04L 67/10 717/173 |
| 2015/0363712 A1* | 12/2015 | Berke | G06F 21/121 705/7.12 |

(Continued)

*Primary Examiner* — Thanh T Le
(74) *Attorney, Agent, or Firm* — Fogarty LLP

(57) ABSTRACT

Systems and methods provide multi-mode validation of modifications to an IHS (Information Handling System) that is factory-provisioned and shipped with hardware capabilities that are not enabled. During factory provisioning of the IHS, two factory-signed certificates are uploaded to the IHS. An inventory certificate identifies factory-installed hardware of the IHS and a capabilities certificate identifies factory-provisioned hardware capabilities of the IHS, such as licensable features of the IHS. Upon deployment of the IHS, multiple validation modes are available. One mode uses the inventory certificate to validate the detected IHS hardware as factory-installed. Another mode uses the capabilities certificate to validate the factory-provisioned hardware capabilities of the IHS that are not enabled. Another mode uses the capabilities certificate to enable a validated factory-provisioned hardware capability of the IHS.

20 Claims, 11 Drawing Sheets

(56) References Cited

U.S. PATENT DOCUMENTS

| | | | |
|---|---|---|---|
| 2015/0381368 A1* | 12/2015 | Stevens, Jr. | H04L 63/126 |
| | | | 705/40 |
| 2016/0048774 A1* | 2/2016 | Prickett | G06Q 10/00 |
| | | | 705/59 |
| 2017/0235928 A1* | 8/2017 | Desai | G06F 21/572 |
| | | | 713/2 |
| 2017/0257369 A1* | 9/2017 | Ito | G06F 21/76 |
| 2019/0042707 A1* | 2/2019 | Young | G06F 21/604 |
| 2020/0044868 A1* | 2/2020 | Vakulenko | G06F 21/305 |
| 2020/0252280 A1* | 8/2020 | Lambert | H04L 41/0863 |
| 2021/0073003 A1* | 3/2021 | Jacquin | G06F 21/44 |
| 2022/0207126 A1* | 6/2022 | Young | H04L 9/3268 |
| 2022/0207145 A1* | 6/2022 | Young | G06F 21/575 |
| 2022/0207185 A1* | 6/2022 | Young | H04L 9/3247 |
| 2022/0207186 A1* | 6/2022 | Young | G06F 21/64 |
| 2022/0207463 A1* | 6/2022 | Young | G06F 21/575 |
| 2023/0217253 A1* | 7/2023 | Palermo | H04W 12/125 |
| | | | 726/23 |
| 2024/0176911 A1* | 5/2024 | Mamut | G06F 21/64 |
| 2024/0265069 A1* | 8/2024 | Wimmer | G06F 21/121 |

\* cited by examiner

MULTI-MODE VALIDATION OF MODIFICATIONS TO AN IHS

FIELD

The present disclosure relates generally to Information Handling Systems (IHSs), and relates more particularly to supporting secure operation of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise-class servers that are stacked and installed within racks. A data center may include large numbers of such racks that may be organized into rows, where the servers installed in each rack may be outwardly very similar looking, such that it may be difficult for administrators to effectively keep track of the configurations and capabilities of any individual server in the data center. Moreover, administration of such large groups of servers may require teams of remote and local administrators working in shifts in order to support around-the-clock availability of the data center operations, while also minimizing any downtime.

Each server IHS within a data center may support a wide variety of possible hardware and software configurations. For instance, a server IHS may be manufactured accordingly to customized hardware and software configurations requested by a customer. However, in some instances, an IHS may be factory provisioned with capabilities that exceed the configurations requested by a customer. Throughout the lifetime of an IHS, the enabled capabilities of the IHS may be modified. For instance, once an IHS has been received and deployed, capabilities of the IHS may be enabled in order to adapt it for a particular computing task.

SUMMARY

In various embodiments, methods and systems provide multi-mode validation of modifications to IHSs (Information Handling Systems). In embodiments, a validation process of an IHS is configured to: enter a first validation mode that validates detected hardware of the IHS as factory-installed hardware; enter a second validation mode that validates factory-provisioned hardware capabilities of the IHS; and enter a third validation mode that enables a first of the factory-provisioned hardware capabilities of the IHS.

In some embodiments, the validation of the detected hardware of the IHS as factory-installed comprises comparing a plurality of detected hardware components of the IHS against an inventory of factory-installed hardware specified in a factory-provisioned inventory certificate. In some embodiments, the inventory certificate is stored to a persistent memory of the IHS during factory-provisioning of the IHS. In some embodiments, the inventory of factory-installed hardware specified in the inventory certificate is signed using a private keypair of the IHS. In some embodiments, the keypair of the IHS is generated by a remote access controller of the IHS and validation of the signed inventory of factory-installed hardware using the public key of the keypair provides confirmation the inventory of factory-installed hardware was generated by the IHS. In some embodiments, the validation of the factory-provisioned hardware capabilities of the IHS identifies non-enabled hardware capabilities of the IHS. In some embodiments, the non-enabled hardware capabilities of the IHS are identified by comparing capabilities enabled in the detected hardware of the IHS against hardware capabilities specified in a factory-provisioned capabilities certificate. In some embodiments, the capabilities certificate is stored to a persistent memory of the IHS during factory-provisioning of the IHS. In some embodiments, the hardware capabilities specified in the capabilities certificate comprises an inventory of hardware capabilities of the IHS that can be licensed for operation. In some embodiments, the third validation mode is configured to evaluate a presented license required for enabling of the first of the factory-provisioned hardware capabilities of the IHS. In some embodiments, the third validation mode detects when the presented license does not correspond to any of the factory-provisioned hardware capabilities, and wherein the third validation mode generates a notification of an attempt to enable a capability of the IHS that is not factory provisioned. In some embodiments, the first validation mode, second validation mode and the third validation mode are modes of a pre-boot validation environment of the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
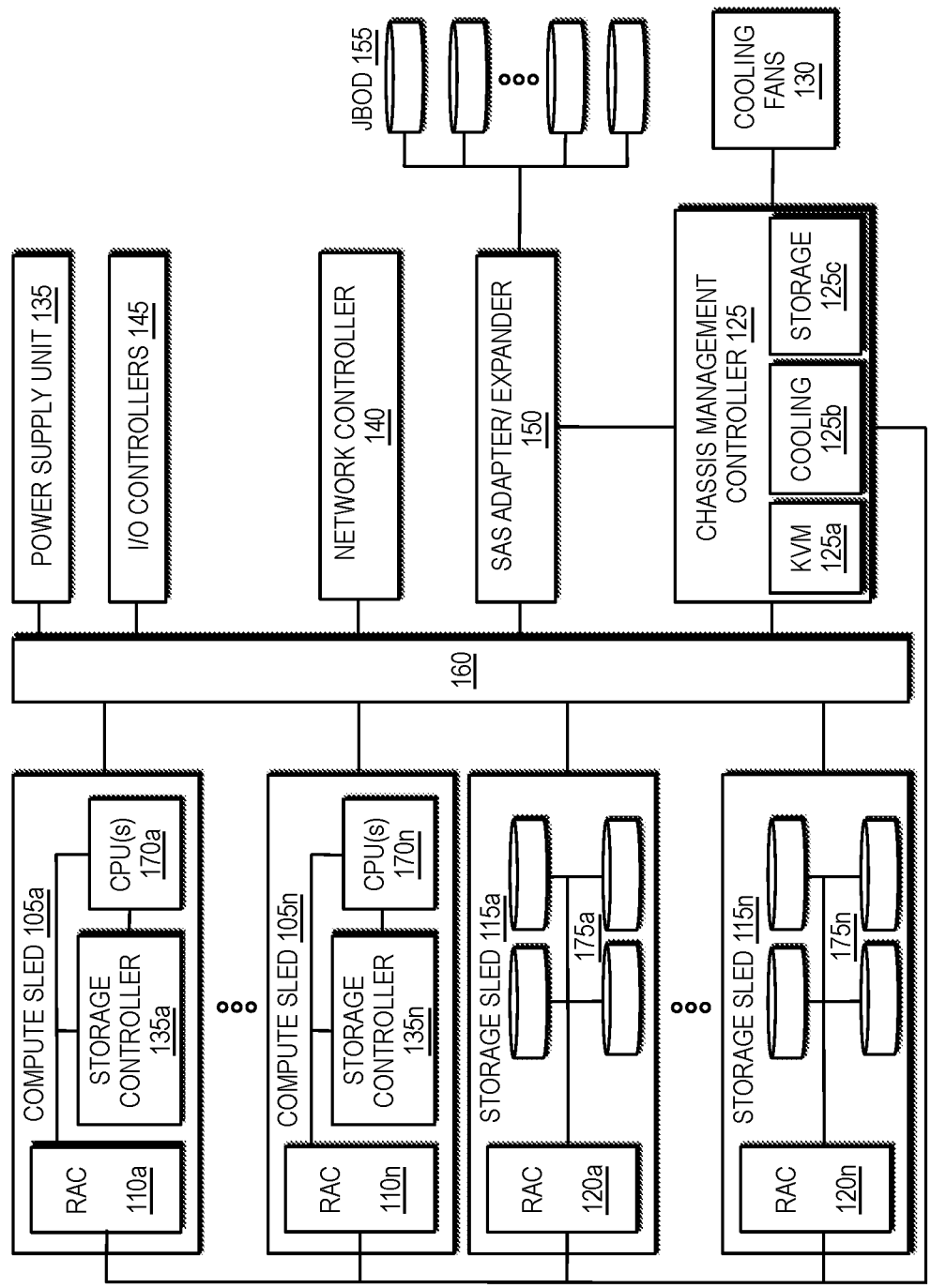
FIG. 1 is a diagram illustrating certain components of a chassis, according to some embodiments, for supporting multi-mode validation of modifications to components of the chassis.

FIG. 1 is a block diagram illustrating certain components of a chassis 100 comprising one or more compute sleds 105*a-n* and one or more storage sleds 115*a-n* that may be configured to implement the systems and methods described herein for supporting multi-mode validation of modifications to components of the chassis 100. Embodiments of chassis 100 may include a wide variety of different hardware configurations. Such variations in hardware configuration may result from chassis 100 being factory assembled to include components specified by a customer that has contracted for manufacture and delivery of chassis 100. Upon delivery and deployment of an IHS, an IHS may be modified by replacing various hardware components of the IHS or by installing new hardware components to the IHS. As described in additional detail below, chassis 100 may allow a customer to validate that hardware detected in chassis 100 as the same factory installed and provisioned hardware that was supplied to the customer. Once chassis 100 has been deployed, initial validation of the chassis 100 components as genuine is provided by embodiments through use of a factory-provisioned inventory certificate.

In addition to an inventory certificate that specifies the factory-provisioned hardware inventory of a chassis 100, embodiments may also generate a capabilities certificate that specifies the factory-provisioned hardware capabilities of the chassis. In many instances, a chassis may be configured for a customer in a manner that utilizes only a portion of the actual capabilities of the chassis. For instance, a chassis 100 may include a rack-mounted server IHS that is configured for use of four processor cores by a customer, even though the IHS is capable of supporting additional processor cores. Accordingly, the configuration of an chassis 100 for a customer may be a subset of the configurations that the chassis is capable of supporting. In embodiments, the set of configurations that could be supported by a chassis may be included in a factory-provisioned capabilities certificate. As described in additional detail below, the inventory certificate and capabilities certificates may be utilized in embodiments to support enabling validated factory-provisioned capabilities of the chassis 100.

Chassis 100 may include one or more bays that each receive an individual sled (that may be additionally or alternatively referred to as a tray, blade, and/or node), such as compute sleds 105*a-n* and storage sleds 115*a-n*. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105*a-n* and storage sleds 115*a-n*, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105*a-n*, 115*a-n* installed within the chassis. A rack and a chassis 100 installed within the rack may utilize various configurations and combinations of cooling fans to cool the sleds 105*a-n*, 115*a-n* and other components housed within chassis 100.

The sleds 105*a-n*, 115*a-n* may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135. In some embodiments, a backplane 160 may be uniquely identified based on a code or other identifier that may be permanently encoded in a non-volatile memory of the backplane 160 by its manufacturer. As described below, embodiments may support validation of backplane 160 as being the same backplane that was installed at the factory during the manufacture of chassis 100. Embodiments may also support validating and enabling factory-provisioned capabilities of backplane 160, such as capabilities of backplane that support the coupling of additional sleds 105*a-n*, 115*a-n* to the chassis 100.

Figure 2:
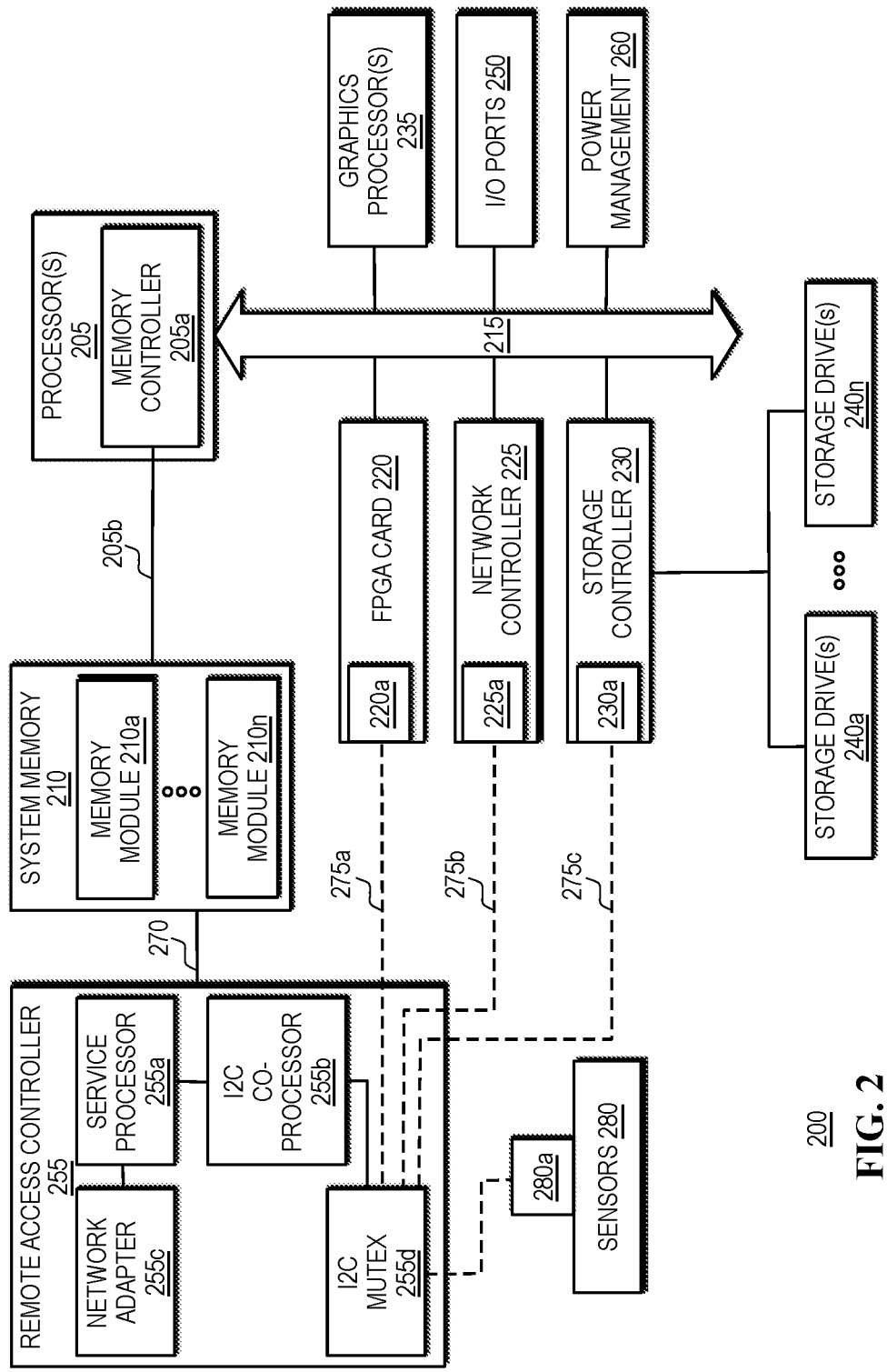
FIG. 2 is a diagram illustrating certain components of an IHS configured, according to some embodiments, for multi-mode validation of modifications to the IHS.

In certain embodiments, a compute sled 105*a-n* may be an IHS such as described with regard to IHS 200 of FIG. 2. A compute sled 105*a-n* may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controllers 110a-n may collect various types of sensor data, such as collecting temperature sensor readings that are used in support of airflow cooling of the chassis 100 and the sleds 105a-n, 115a-n. In addition, each remote access controller 110a-n may implement various monitoring and administrative functions related to compute sleds 105a-n that utilize sideband bus connections with various internal components of the respective compute sleds 105a-n.

In some embodiments, each compute sled 105a-n installed in chassis 100 may be uniquely identified based on a code or other identifier that may be permanently encoded in a non-volatile memory of a respective compute sled 105a-n by its manufacturer. As described below, embodiments support validation of each compute sled 105a-n as being a compute sled that was installed at the factory during the manufacture of chassis 100. Also as described below, during a provisioning phase of the factory assembly of chassis 100, a signed certificate that specifies hardware components of chassis 100 that were installed during its manufacture may be stored in a non-volatile memory accessed by a remote access controller 110a-n of a compute sled 105a-n. Using this signed inventory certificate, a customer may validate that the hardware components of chassis 100 are the same components that were installed at the factory during its manufacture.

Also as described in additional detail below, factory provisioning of chassis 100 may also include a signed capabilities certificate may also be generated that specifies the factory-provisioned capabilities of the chassis 100. In many instances, chassis 100 may manufactured and provisioned such that the chassis 100 supports capabilities that exceed the capabilities with which the IHS has been configured for a particular customer. For example, chassis 100 may be configured to support additional storage capabilities through a JBOD 155 configuration of storage drives that are operated via a SAS adapter 150, even though chassis 100 is provisioned for a customer any of these JBOD capabilities of the chassis being enabled. In embodiments, all such capabilities of chassis 100 may be included within a signed capabilities certificate and utilized to support modifications to the chassis 100 by the customer, such as in enabling operation of validated factory-provisioned capabilities of the chassis 100.

Each of the compute sleds 105a-n may include a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some embodiments, a SAS expander 150 and storage drive 155 may be uniquely identified based on a code or other identifier that may be permanently encoded in a non-volatile memory of the SAS expander 150 or storage drive 155 by its respective manufacturer. In instances where SAS expander 150 and storage drives 155 are factory installed, as described below, embodiments may support validation of SAS expander 150 and storage drives 155 as being the same SAS expander and storage drives that were installed at the factory during the manufacture of chassis 100. In embodiments, a capabilities certificate generated during factory provisioning of chassis 100 may specify capabilities of SAS expander 150 and/or storage drives 155 that are supported, but are not enabled in the configuration in which chassis 100 has been assembled and provisioned for a customer.

As illustrated, chassis 100 also includes one or more storage sleds 115a-n that are coupled to the backplane 160 and that are installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n includes a remote access controller (RAC) 120a-n provides capabilities for remote monitoring and management of respective storage sleds 115a-n. In some embodiments, each storage sled 115a-n may be uniquely identified based on a code or other identifier that may be permanently encoded in a non-volatile memory of the respective storage sled 115a-n by its manufacturer. As described below, embodiments support validation of each storage sled 115a-n as being a storage sled that was installed at the factory during the manufacture of chassis 100. In embodiments, a capabilities certificate generated during factory provisioning of chassis 100 may specify storage sled 115a-n capabilities that are supported, but are not enabled in the configuration in which chassis 100 has been assembled and provisioned for a customer.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. In some embodiments, a network controller 140 may be uniquely identified based on a code or other identifier that may be permanently encoded in a non-volatile memory of the network controller 140 by its manufacturer. As described below, embodiments support validation of network controller 140 as being the same network controller that was installed at the factory during the manufacture of chassis 100. In embodiments, a capabilities certificate generated during factory provisioning of chassis 100 may specify capabilities of network controller 140 that are supported, but are not enabled in the configuration in which chassis 100 has been assembled and provisioned for a customer.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. In some embodiments, a power supply unit 135 may be uniquely identified based on a code or other identifier that may be permanently encoded in a non-volatile memory of the power supply unit 135 by its manufacturer. As described below, embodiments support validation of power supply unit 135 as being the same power supply unit that was installed at the factory during the manufacture of chassis 100. In embodiments, a capabilities certificate generated during factory provisioning of chassis 100 may specify capabilities of power supply unit 135 that are supported, but are not enabled in the configuration in which chassis 100 has been assembled and provisioned for a customer.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. In some embodiments, each I/O controller 140 may be uniquely identified based on a code or other identifier that may be permanently encoded in a non-volatile memory of the respective I/O controller 140 by its manufacturer. As described below, embodiments support validation of I/O controllers 140 as being the same I/O controllers that were installed at the factory during the manufacture of chassis 100. In embodiments, a capabilities certificate generated during factory provisioning of chassis 100 may specify capabilities of I/O controllers 140 that are supported, but are not enabled in the configuration in which chassis 100 has been assembled and provisioned for a customer.

The chassis management controller 125 may also include a storage module 125c that provides capabilities for managing and configuring certain aspects of the storage devices of chassis 100, such as the storage devices provided within storage sleds 115a-n and within the JBOD 155. In some embodiments, a chassis management controller 125 may be uniquely identified based on a code or other identifier that may be permanently encoded in a non-volatile memory of the chassis management controller 125 by its manufacturer. As described below, embodiments support validation of chassis management controller 125 as being the same chassis management controller that was installed at the factory during the manufacture of chassis 100. In embodiments, a capabilities certificate generated during factory provisioning of chassis 100 may specify capabilities of chassis management controller 125 that are supported, but are not enabled in the configuration in which chassis 100 has been assembled and provisioned for a customer.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting multi-mode validation of modifications to the IHS 200. It should be appreciated that although the embodiments described herein may describe an IHS that is a compute sled or similar computing component that may be deployed within the bays of a chassis, other embodiments may be utilized with other types of IHSs that may also support validation of the secure assembly and delivery of the IHS 200. In the illustrative embodiment of FIG. 2, IHS 200 may be a computing component, such as compute sled 105a-n or other type of server, such as an 1RU server installed within a 2RU chassis, that is configured to share infrastructure resources provided by a chassis 100.

As described, an IHS 200 may be assembled and provisioned according to customized specifications provided by a customer. Once the IHS has been shipped and deployed, ongoing technical support may be provided for the IHS 200 based on a unique identifier, such as a Service Tag or service identifier. Such a service identifier may be logically associated with the IHS 200 and also the factory-installed components of the IHS.

The IHS 200 of FIG. 2 may be a compute sled, such as compute sleds 105a-n of FIG. 1, that may be installed within a chassis, that may in turn be installed within a rack. Installed in this manner, IHS 200 may utilize shared power, network and cooling resources provided by the chassis and/or rack. Embodiments of IHS 200 may include a wide variety of different hardware configurations. Such variations in hardware configuration may result from IHS 200 being factory assembled to include components specified by a customer that has contracted for manufacture and delivery of IHS 200. As described in additional detail below, IHS 200 may include capabilities that allow a customer to validate that the hardware components of IHS 200 are the same hardware components that were installed at the factory during its manufacture, where these validations of the IHS hardware may be initially completed using a factory-provisioned inventory certificate.

As with chassis 100, in addition to an inventory certificate that specifies the factory-provisioned inventory of an IHS 200, embodiments may also generate a capabilities certificate that specifies the factory-provisioned hardware capabilities of the IHS. In many instances, an IHS may be configured for a customer such that only a portion of the actual capabilities of the IHS are enabled for use. For instance, an IHS may be a rack-mounted server that is configured for use of only a portion of the storage drives 240a-n that the IHS 200 is capable of supporting. Accordingly, the configuration of an IHS for a customer may be a subset of the configurations that the IHS could support. In embodiments, the set of hardware configurations that could be supported by an IHS 200 may be included in a factory-provisioned capabilities certificate. As described in additional detail below, the inventory certificate and capabilities certificates may be utilized in embodiments to support enabled validated factory-provisioned capabilities of an IHS 200.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer. As described below, embodiments support validation of processors 205 as being the same processors that were installed at the factory during the manufacture of IHS 200. In some instances, a capabilities certificate generated during factory provisioning of IHS 200 may specify capabilities of processors 205 that are supported, but are not enabled in the configuration in which IHS 200 has been assembled and provisioned for a customer. For instance, processors 205 may be capable of supporting up to eight distinct processor cores, which would be specified in the capabilities certificate, but may be factory provisioned with only four of these processor cores enabled, as specified in the inventory certificate of the IHS 200.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b. The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210a-n may be uniquely identified based on a code or other identifier that may be permanently encoded in a respective memory module 210a-n by its manufacturer.

As described below, embodiments support validation of memory modules 210a-n as being the same memory modules that were installed at the factory during the manufacture of IHS 200. The capabilities certificate generated during factory provisioning of IHS 200 may specify system memory 210 capabilities of that are supported, but are not enabled in the configuration in which IHS 200 has been assembled and provisioned for a customer. For instance, system memory 210 may be capable of supporting up to ten high speed memory modules 210a-n, which would be specified in the capabilities certificate, but may be factory provisioned with only five memory module slots enabled, as specified based on the memory modules in the inventory certificate of the IHS 200.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a.

In some embodiments, each of the FPGA cards 220 installed in IHS 200 may be uniquely identified based on a code or other identifier that may be permanently encoded in the FPGA card 220 by its manufacturer. As described below, embodiments support validation of FPGA card 220 as being the same FPGA card that was installed at the factory during the manufacture of IHS 200. The capabilities certificate generated during factory provisioning of IHS 200 may specify FPGA card 220 capabilities of that are supported, but are not enabled in the configuration in which IHS 200 has been assembled and provisioned for a customer. For instance, FPGA card 220 may support APIs for programming the operations performed by the FPGA, where these APIs would be specified in the capabilities certificate, but may be factory provisioned without enabling of these APIs, as specified in the inventory certificate of the IHS 200, thus allowing use of the FPGA card 200 without allowing any reprogramming of the FPGA operations.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. In some embodiments, network controller 225 may be uniquely identified based on a code or other identifier, such as a MAC address, that may be permanently encoded in a non-volatile memory of network controller 225 by its manufacturer.

As described below, embodiments support validation of network controller 225 as being the same network controller that was installed at the factory during the manufacture of IHS 200. The capabilities certificate generated during factory provisioning of IHS 200 may specify network controller 225 capabilities of that are supported, but are not enabled in the configuration in which IHS 200 has been assembled and provisioned for a customer. For instance, network controller 225 may be capable of supporting enhanced encryption or other security protocols, which would be specified in the capabilities certificate, but may be factory provisioned without enabling these enhanced security protocols.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. Embodiments support validation of power management unit as being installed at the factory during the manufacture of IHS 200. The capabilities certificate generated during factory provisioning of IHS 200 may specify power management unit 260 capabilities of that are supported, but are not enabled in the configuration in which IHS 200 has been assembled and provisioned for a customer. For instance, power management unit 260 may be capable of supporting high-power modes, which would be specified in the capabilities certificate, but may be factory provisioned without enabling these high-power operating modes by the power management unit 260.

In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer.

As described below, embodiments support validation of graphics processor 235 as being installed at the factory during the manufacture of IHS 200. The capabilities certificate generated during factory provisioning of IHS 200 may specify graphics processor 235 capabilities of that are supported, but are not enabled in the configuration in which IHS 200 has been assembled and provisioned for a customer. For instance, graphics processor 235 may be capable of supporting offloaded processing capabilities, such as for training AI models, which would be specified in the capabilities certificate, but may be factory provisioned without enabling these offloading capabilities.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as the described inventory certificate generation and validation operations, may operate using validated instructions, and thus within the root of trust of IHS 200.

In some embodiments, remote access controller 255 may be uniquely identified based on a code or other identifier that may be permanently encoded in a non-volatile memory of the remote access controller 255 by its manufacturer. As described below, embodiments support validation of remote access controller 255 as being the same controller that was installed at the factory during the manufacture of IHS 200. Also as described below, during a provisioning phase of the factory assembly of IHS 200, a signed certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200, or as being a trusted hardware components installed by the customer.

Also as described below, in another aspect of the provisioning phase of the factory assembly of IHS 200, an additional signed certificate, referred to herein as a 'capabilities certificate,' that specifies factory provisioned hardware capabilities of IHS 200 may also be stored in the non-volatile memory that is accessed by remote access controller 255. Using this signed capabilities certificate stored by the remote access controller 255, a customer may validate the trusted capabilities of the IHS 200 that have been factory provisioned. This validation using the capabilities certificate may be used to identify supported factory provisioned capabilities of the IHS 200 that could be enabled by the customer in order to improve the performance of the IHS, without exposing the IHS to the risk of operating non-factory-provisioned capabilities. In addition, embodiments support use of the capabilities certificate in securely enabling these factory-provisioned capabilities of the IHS 200.

In some embodiments, the capabilities certificate generated during factory provisioning of IHS 200 may specify remote access controller 255 capabilities of that are supported, but are not enabled in the configuration in which IHS 200 has been assembled and provisioned for a customer. For instance, remote access controller 255 may be capable of various remote management operations, which would be specified in the capabilities certificate, but may be factory provisioned without enabling these remote management operations, such as without enabling a specific remote management protocol (e.g., REDFISH).

In support of the capabilities for validating the detected hardware components of IHS 200 against the inventory information that is specified in a signed inventory certificate and for validating and enabling factory-provisioned capabilities of the IHS 200, remote access controller 255 may support various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign installed inventory and capabilities information collected during the factory assembly of IHS 200 such that the integrity of this signed inventory and capability information may be validated at a later time using the remote access controller's 255 public key that is endorsed by these certificates, such as by a customer that has purchased IHS 200. Using these cryptographic capabilities of the remote access controller, the factory installed inventory information and factory provisioned capabilities that are included in these certificates may be anchored to a specific remote access controller 255, since the keypair used to sign the inventory and capability information is signed using the private key that is generated and maintained by the remote access controller 255.

In some embodiment, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority. By encrypting a private key using the hardware root key of IHS 200, the hardware inventory and capability information that is signed using this private key is further anchored to the root of trust of IHS 200. If a root of trust cannot be established through validation of the remote access controller cryptographic functions that are used to access the hardware root key, the private key used to sign inventory and capability information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280. In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
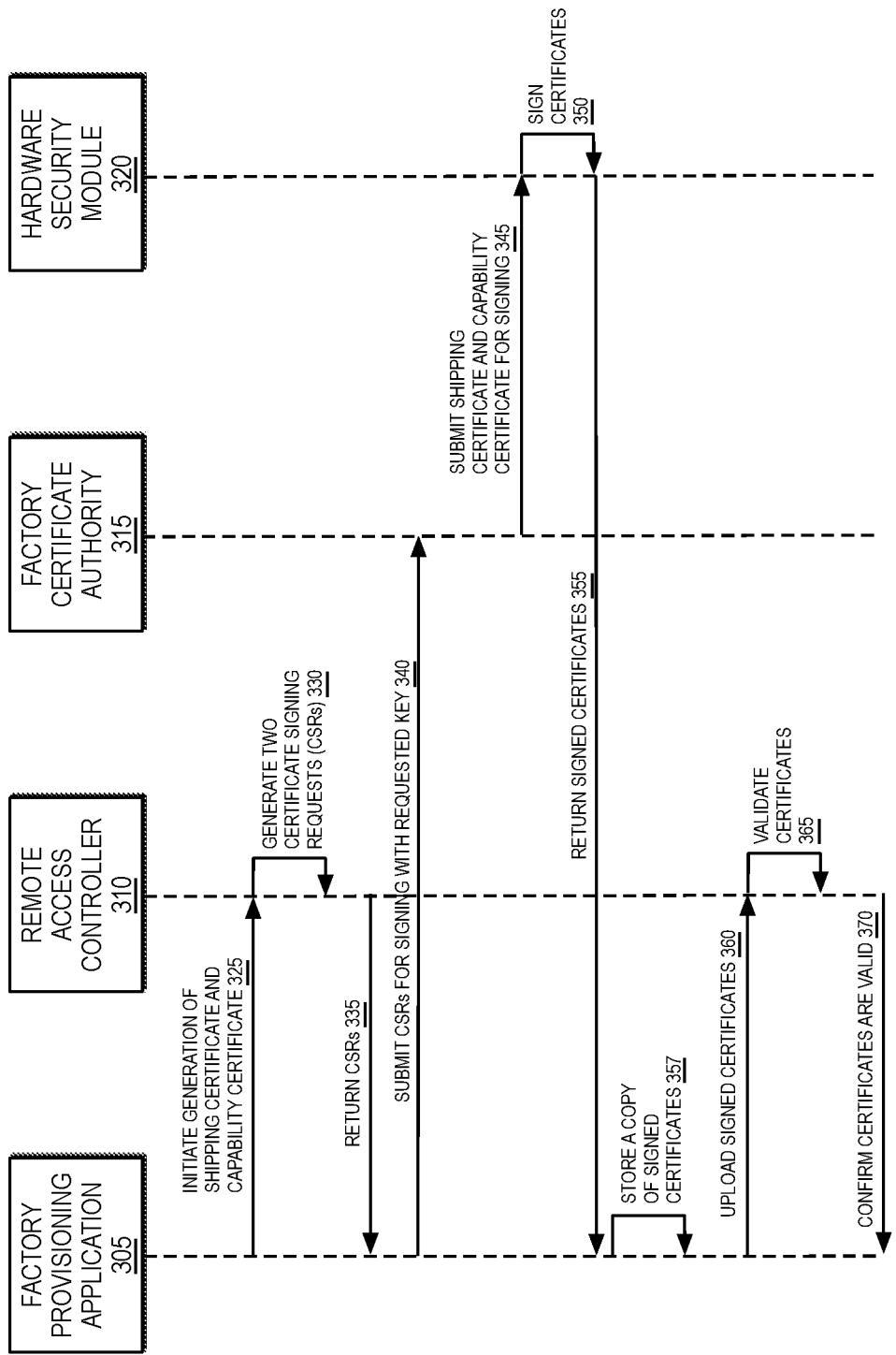
FIG. 3 is a swim lane diagram illustrating certain responsibilities of components of a system configured according to certain embodiments for factory provisioning of an IHS in a manner that supports multi-mode validation of modifications to the IHS.
Figure 4A:
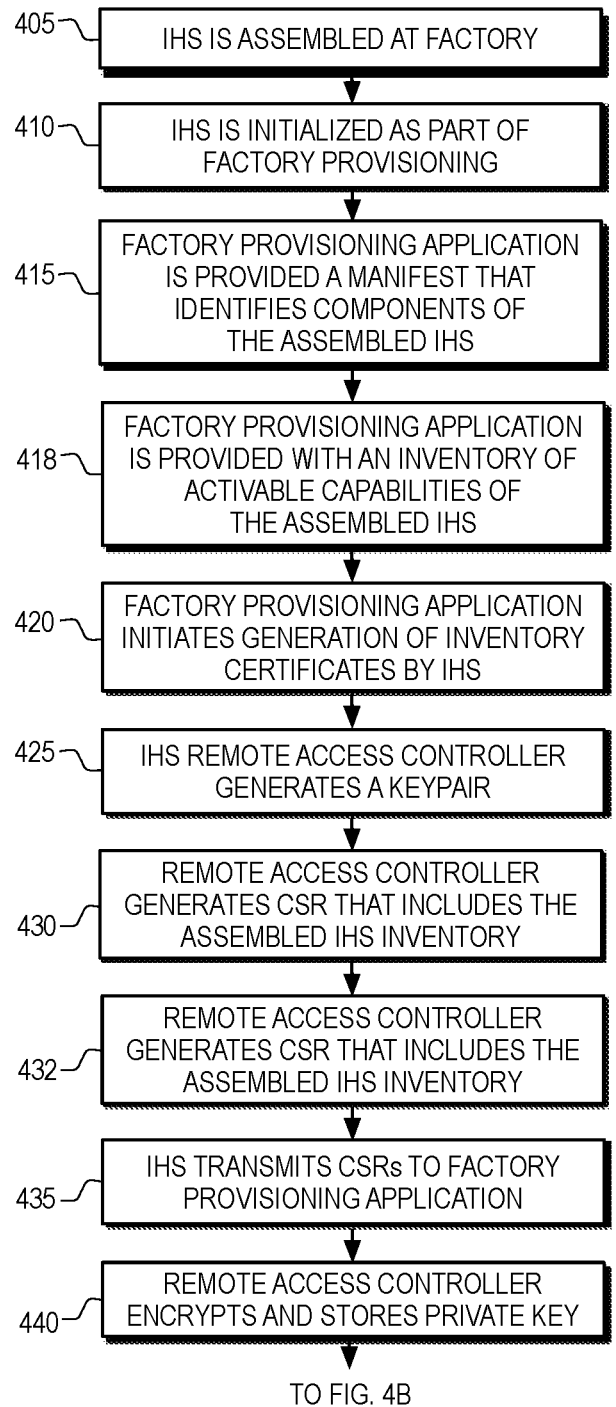
FIG. 4A is a flowchart describing certain steps of a method, according to some embodiments, for assembly and provisioning of an IHS in a manner that supports multi-mode validation of modifications to the IHS.
Figure 4B:
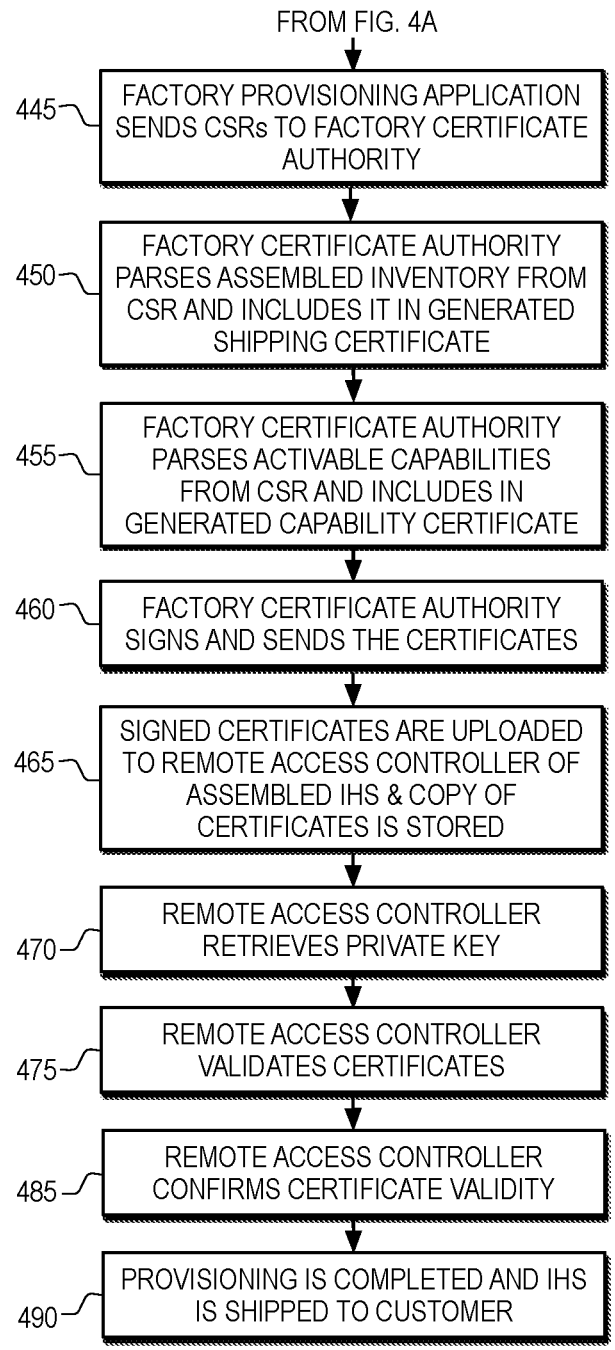
FIG. 4B is a flowchart that is a continuation of the flowchart of FIG. 4A.

FIG. 3 is a swim lane diagram illustrating certain responsibilities of components of a system configured according to certain embodiments for factory provisioning of an IHS in a manner that supports multi-mode validation of modifications to the IHS. FIGS. 4A-B are a flowchart describing certain steps of a method, according to some embodiments, for factory provisioning of an IHS in a manner that supports multi-mode validation of modifications to the IHS. Some embodiments of the method of FIGS. 4A-B may begin, at block 405, with the factory assembly of an IHS, such as the assembly of a rack-mounted server IHS described with regard to FIGS. 1 and 2. In some instances, an IHS may be manufactured using a factory process that includes multiple phases of assembly, validation and provisioning that must be completed before the IHS is supplied to a customer. As described, an IHS such as a server may be purpose-built for a particular customer such that the server is assembled and provisioned according to specifications provided by the customer.

The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS. In many instances, hardware components installed during the assembly of the IHS may support capabilities that may be enabled and disabled through various mechanisms for configuring these hardware components. For instance, as described above, a processor of an IHS may support operations using multiple distinct processor cores that can be separately enabled and disabled.

Once the assembly of an IHS has been completed, the IHS may be subjected to manual and automated inspections that confirm the IHS has been properly assembled and does not include any defects. After confirming an IHS has been assembled without any manufacturing defects, at block 410, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application, where this factory provisioning application may run on one or more servers and may interface with an IHS that is being provisioned once a requisite amount of firmware and software has been installed to the IHS.

As described, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. At block 415, a manifest generated during assembly of an IHS is provided to the factory provisioning application that is being used to provision the assembled IHS.

In embodiments, factory provisioning may also include generating an additional manifest of the hardware capabilities of the IHS. As described, the factory installed hardware of an IHS may support capabilities that are not requested by the customer for which the IHS is being provisioned. In such instances, those capabilities of the factory installed hardware are thus not enabled. During factory provisioning, at 418, the manifest of installed hardware may be utilized to generate a manifest of the capabilities of each of the installed hardware components that may be enabled and disabled. This manifest may be expanded to include subsystem capabilities that are enabled through the use of the installed hardware. For instance, installation of storage controller 230 and particular storage drives 240*a-n* allows an IHS to support storage system capabilities, such as RAID. Additional storage system capabilities, such as virtualized high-speed storage spanning multiple chassis, may be supported by IHS 200 based on the particular network controller 225 that is installed along with the storage controller 230 and storage drives 240*a-n*. Through such evaluation of installed hardware, embodiments may identify all hardware capabilities of IHS 200 that may be enabled. In some instances, such hardware capabilities that may be enabled for an IHS 200 may include all licensable capabilities of the hardware installed in the IHS. As with the manifest of installed hardware, this manifest of hardware capabilities of the IHS 200 that may be enabled is provided to the factory provisioning application being used in the provisioning of the IHS.

Based on receipt of the installed hardware manifest and the manifest of hardware capabilities that can be enabled, at block 420, the factory provisioning application may initiate the generation of an inventory certificate that may be used to validate that the detected hardware components of the IHS are the same hardware components that were installed during the factory assembly of the IHS, and may also initiate generation of a capabilities certificate that may be used to validate and enable that factory provisioned capabilities of an IHS.

As indicated in FIG. 3, the generation of these certificates for a newly assembled IHS, at 325, may be initiated via a request from the factory provisioning application 305 to the remote access controller 310 of the IHS. As described with regard to FIG. 2, a remote access controller of an IHS may include cryptographic capabilities that operate within the root of trust of the IHS and that include the ability to generate cryptographic keypairs. Utilizing such cryptographic capabilities, at block 425, the remote access controller 310 initiates the generation of the certificates by generating a cryptographic key pair for use in validating the authenticity of inventory information and capability information that is specified in the respective certificates.

At block 430 and at 330, the remote access controller 310 generates two certificate signing requests (CSRs) for two digital identity certificates. In some embodiments, both identity certificates will endorse the same public key, such that both CSRs include the same public key of a key pair generated by the remote access controller. In some embodiments, each of the certificates will endorse different public keys and be associated with an additional private keypair that is generated by the remote access controller. The CSR for the inventory certificate also specifies the factory installed hardware inventory from the manifest that was generated during assembly of the IHS. The factory installed hardware inventory information included in the CSR may be signed by the remote access controller using the private key from the generated keypair. The CSR for the capabilities certificate specifies a listing of the factory provisioned hardware capabilities of the IHS that may be enabled. The factory provisioned capability information included in the CSR may also be signed using a private key of the remote access controller.

At block 435 and at 335, the CSRs for the requested certificates are transmitted to the factory provisioning application 305 by the remote access controller 310. At block 440, the remote access controller safeguards the private key from the generated key pair(s). In some embodiments, the remote access controller may encrypt the private key(s) using the hardware root key (HRK) of the IHS and may store the encrypted key(s) to a protected memory, such as the replay protected memory block that is described with regard to FIG. 2.

Upon receiving the certificate signing requests from the remote access controller 310, at block 445 and at 340, the factory provisioning application 305 submits the CSRs for signing by a factory certificate authority 315. In some embodiments, the factory provisioning application 305 specifies a factory key to be used by the factory certificate authority 315 in signing the certificates. For instance, the factory provisioning application may include the name of a trusted certificate associated with a factory key as an attribute of the CSRs that are transmitted to the factory certificate authority 315. Upon receipt of the CSR for the inventory certificate, at block 450, the factory certificate authority parses from that CSR: the signed hardware inventory information, the public key of the keypair generated by the remote access controller and the information specifying the requested signing key. Based on the information parsed from that CSR, the factory certificate authority generates a digital identity certificate, referred to herein as an inventory certificate, that endorses the public key presented in the CSR by the remote access controller, and that specifies the factory installed hardware inventory of the IHS.

Upon receipt of the CSR for the capabilities certificate, at block 455, the factory certificate authority parses from that CSR: the signed hardware capability information for the IHS, the public key of the keypair generated by the remote access controller and the information specifying the requested signing key. Based on the information parsed from that CSR, the factory certificate authority generates a digital identity certificate, referred to herein as a capability certificate, that endorses the public key presented in the CSR by the remote access controller, and that specifies the factory provisioned hardware capabilities of the IHS that may be enabled.

As indicated in FIG. 3, at 345, the factory certificate authority 315 submits the generated certificates for signing by a hardware security module 320 that may be a dedicated hardware component of a factory provisioning server that safeguards cryptographic keys and implements cryptographic functions utilized in the factory provisioning process. In some embodiments, the factory certificate authority 315 may also specify a certificate name associated with a signing key that is maintained by the hardware security module 320. At 350, the hardware security module 320 utilizes the private key associated with the specified certificate in order to digitally sign the submitted certificates, and the inventory and capability information specified in the respective certificates. The signed certificates are then returned to the factory certificate authority 315 by the hardware security module 320.

Once the certificates have been signed, at block 460 and at 355, the signed certificates are transmitted from the factory certificate authority 315 to the factory provisioning application 305. As indicated in FIG. 3 at 357, the factory provisioning application 305 may store copies of each of the signed certificates. In some instances, the copies may be saved to a data store utilized in providing ongoing support of the IHS once it has been shipped and has been deployed by a customer.

At block 465 and at 360, the signed certificates are then loaded to the assembled IHS. As indicated in FIG. 3, in some embodiments, the signed certificates may be uploaded to a remote access controller 310 of the assembled IHS, such that the signed certificates may each be stored to a nonvolatile memory or other persistent storage that is accessible by the remote access controller 310 independent from the operating system of the IHS. In other embodiments, the signed certificates may be uploaded without reliance on the remote access controller to another non-volatile memory of the IHS.

Some embodiments may continue, at 365, with the validation of the signed certificates by the remote access controller 310. Using the private key from the generated keypair, at block 475, the remote access controller decrypts the signed inventory information included by the remote access controller in the CSR for the inventory certificate and confirms that the inventory information specified in the received inventory certificate matches the inventory information that was submitted in the certificate signing request, thus validating the integrity of the generation of the signed inventory certificate. In this same manner, the remote access controller decrypts the signed capability information included by the remote access controller in the CSR for the capabilities certificate and confirms that the capability information specified in the received capability certificate matches the capability information that was submitted in the certificate signing request, thus validating the integrity of the generation of the signed capability certificate.

At block 485, the remote access controller confirms that the signed certificates are valid and, at 370, the remote access controller 310 confirms the validity of the certificates with a notification to the factory provisioning application 305. With the generation and validation of the inventory certificate and capabilities certificate completed, additional factory provisioning of the assembled IHS may be completed and, at block 490, the assembled IHS may be shipped from the factory to a customer.

Upon delivery of the IHS, embodiments provide a customer with the capability of validating that the delivered IHS includes only hardware components that were installed at the factory during manufacture of the IHS. Embodiments thus support an initial validation of the secure assembly and delivery of an IHS. Such validations may be repeated each time an IHS is initialized, or in response to detected security conditions. Embodiments also provide a customer with a capability of validating the factory-provisioned hardware capabilities of the IHS, thus validating all of the hardware supported features of the IHS that may be enabled. Embodiments also support validated enablement of these factory-provisioned hardware capabilities of the IHS.

Figure 5:
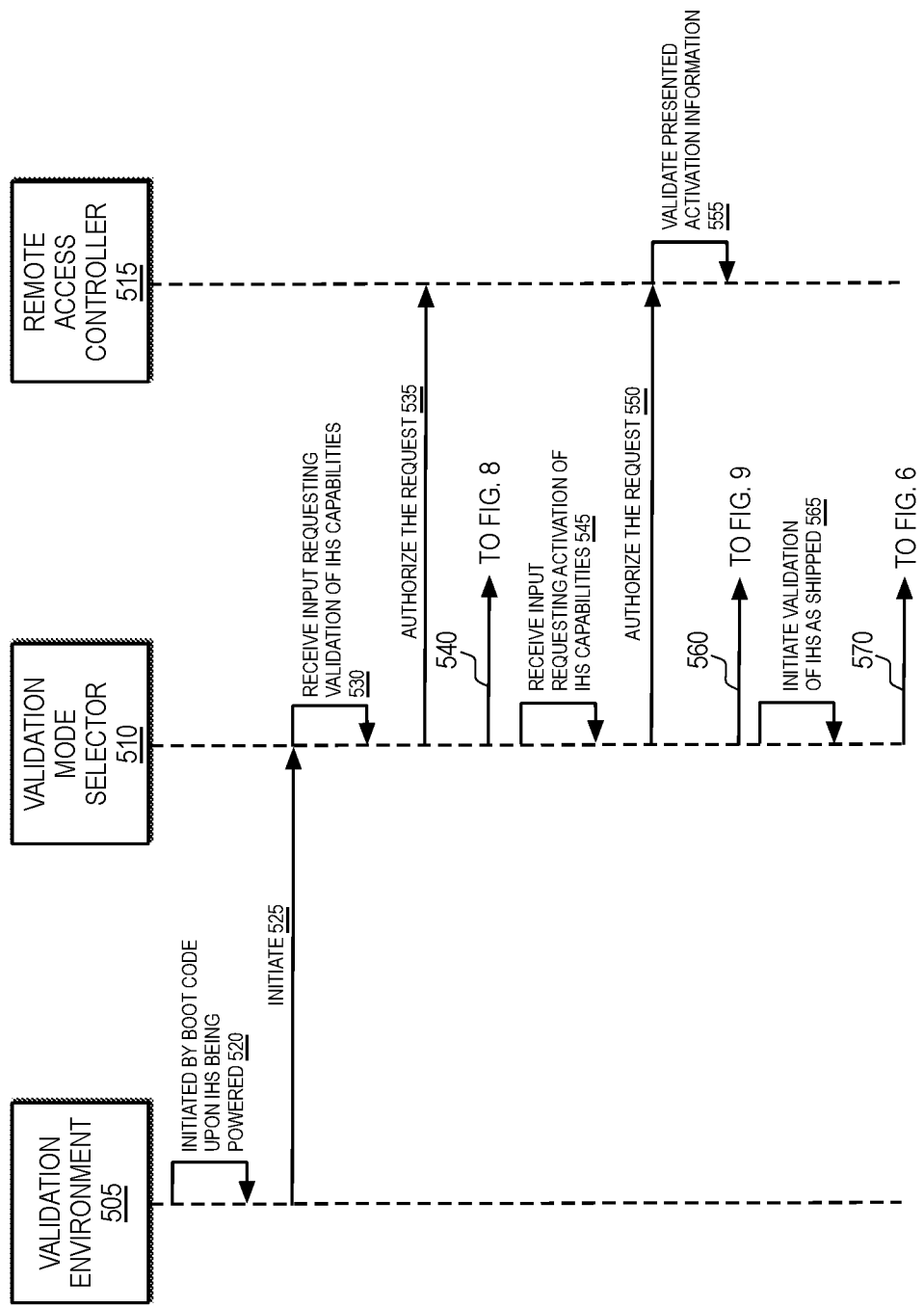
FIG. 5 is a swim lane diagram illustrating certain responsibilities of components of an IHS configured according to certain embodiments for multi-mode validation of modifications to the IHS.

FIG. 5 is a swim lane diagram illustrating certain responsibilities of components of an IHS configured according to certain embodiments for multi-mode validation of modifications to the IHS. Embodiments may begin, with the delivery of an IHS to a customer, where the IHS has been assembled and provisioned according to the procedures set forth above. In particular, the delivered IHS has been provisioned at the factory to include a signed inventory certificate that specifies the factory installed hardware components of the IHS, and has been further provisioned with a capabilities certificate that specifies the factory-provisioned hardware capabilities of the IHS.

Upon receiving an IHS configured in this manner, the IHS may be unpacked, assembled and initialized by an administrator. In some instances, an IHS may be ready for immediate deployment by a customer. In other instances, an IHS may require further provisioning by customer before it is deployed, such as for operation within a particular data center. As such, in various instances, an IHS may be unpacked, assembled and initialized in order to deploy the IHS or to prepare it for further provisioning. The IHS is then been powered for the first time and, at 5820, a validation environment 505 is initialized, such as based on boot code of the IHS.

In some instances, the validation environment 505 may be initialized as part of the initial provisioning of an IHS by a customer. In some embodiments, the validation environment 505 may be a PXE (Preboot execution Environment) operating environment. In some embodiments, a PXE validation environment 505 in which a validation process runs may be retrieved from a network location and may be executed using the main processing and system memory capabilities of the IHS. In some embodiments, a PXE validation environment 505 may be retrieved using secure protocols, such as HTTPS, in order to assure the integrity of the operating environment instructions that are retrieved and utilized. In some embodiments, the validation environment 505 may be executed by the remote access controller 505 of the IHS based on validated firmware instructions. Through such pre-boot validation environments 505, the validation of the detected hardware components and capabilities of the IHS may be conducted prior to booting of the operating system of the IHS.

In some embodiments, the validation environment 505 may run as part of a diagnostic mode that is supported by an IHS. For instance, an IHS may support a diagnostic mode that may be initiated by a user or may be initiated automatically in response to detecting various conditions, where the diagnostic mode may support various diagnostic tools, including the described hardware validation and capability validation procedures. In some embodiments, the diagnostic mode may involve re-booting the IHS to a diagnostic environment, while other embodiments may support diagnostic mode operations that run within the operating system of the IHS. Accordingly, some embodiments may support the described hardware and capability validation procedures as a feature available within the operating system of the IHS. In such embodiments, the operating system may be configured to periodically conduct the described hardware validation procedures, such as on a daily or weekly basis. The operating system may likewise be configured to conduct the hardware validation procedures in response to a detected security notification, such as a notification that a process is attempting to access a protected resource. In some embodiments, the described validation procedures may be implemented in part remotely, such as via the described HTTPS protocols, where the remote validation procedures may rely both on information retrieved from the IHS via HTTPS and on remote information, such as information maintained by the manufacturer of the IHS or by an entity supporting the administration of the IHS.

As indicated in FIG. 5, once the validation environment 505 has been initiated, at 525, a validation mode selection process 510 may be initiated within the environment. Through this validation mode selector 510, various capabilities may be provided for selection of available validation modes. For instance, a text menu may be presented by which an administrator can select from the available validation modes. In other embodiments, a graphical menu may be provided by the validation environment 505 for presenting the available validation modes to an administrator and for selection of one of these modes by the administrator.

In some instances, at 530, the validation mode selector 510 detects an input requesting validation of the factory-provisioned hardware capabilities of the IHS. As described, an IHS may be factory provisioned with a capabilities certificate that specifies the hardware capabilities of the IHS that have been factory provisioned and may be enabled for operation by the IHS. Some or all of these capabilities may be enabled for operation, such as based on the features of the IHS that have been licensed for use by a customer. In many instances, only a subset of the factory-provisioned hardware capabilities of an IHS may be enabled. However, in various instances, an administrator may be interested in the capabilities of an IHS beyond those that are already enabled and in operation on the IHS. For instance, an administrator may be looking for underutilized computing resources, or may be looking for an IHS that has available resources to support a specific computing task. However, the administrator may be limited in modifying the hardware of an IHS and may thus be limited to utilizing only factory-provisioned hardware capabilities of an IHS. In some embodiments, at 535, a request from an administrator for validation of the available factory-provisioned hardware capabilities of an IHS may be authorized through operations by the remote access controller 515. For instance, remote access controller 515 may confirm credentials presented by the administrator as authorizing access to validation of hardware capabilities. As indicated in FIG. 5, at 540, embodiments transition to FIG. 8 for the validation of the factory-provisioned hardware capabilities of the IHS. Based on the procedures described with regard to FIG. 8, embodiments may generate a graphical interface that displays the factory-provisioned hardware capabilities of the IHS for review by the administrator that has provided the inputs detected by the validation mode selector 510.

In some scenarios, at 540, the validation mode selector 510 detects in input indicating a request to enable a factory-provisioned hardware capability of the IHS. In some instances, such a request may originate based on the graphical interface providing the factory-provisioned hardware capabilities of the IHS. For instance, the graphical interface may display a listing of non-enabled hardware capabilities of the IHS, where the display may provide the administrator with options for enabling one or more of these hardware capabilities. In other scenarios, an administrator may provide an input selecting a validation mode for enabling factory-provisioned hardware capabilities of the IHS, without first having performed the operations of FIG. 8 to identify these factory-provisioned hardware capabilities. For instance, an administrator may run the operations of FIG. 8 to determine the factory-provisioned hardware capabilities of the IHS and upon review of the presented information, may return at a later date to enable one of these hardware capabilities, such as after procuring a required license.

In either scenario, at 545, the validation mode selector 510 detects in input requesting a validation mode for enabling a factory-provisioned hardware capability of the IHS. In many instances, enabling a hardware capability of an IHS requires obtaining a license or other form of authorization for use of that capability. For example, a customer may obtain a license for operation of four processor cores of an IHS and may obtain licenses for enabling additional factory provisioned processor cores of the IHS. Accordingly, at 550, the request to enabled the hardware capability may be authorized based on request to the remote access controller 515. As described in additional detail with regard to FIG. 9, the remote access controller 515 may receive a file, token or other information presented as a license and may confirm the presented information successfully authorizes enablement of the requested capability. As indicated in FIG. 5, embodiments transition for FIG. 9 for the procedures used in enabling factory-provisioned hardware capabilities of an IHS.

Figure 6:
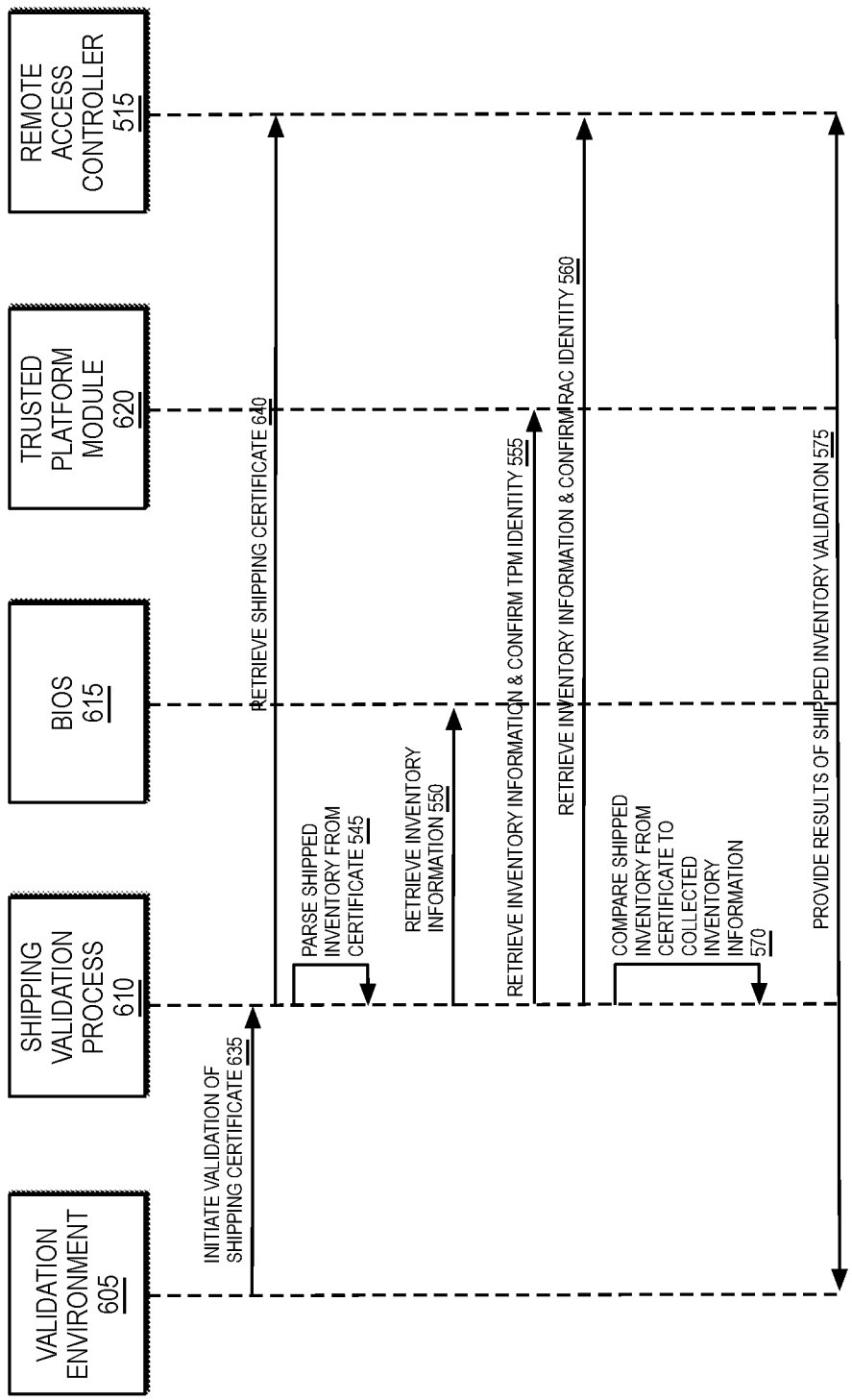
FIG. 6 is a swim lane diagram illustrating certain responsibilities of components of an IHS configured according to certain embodiments for validation of the IHS as shipped to a customer.
Figure 7A:
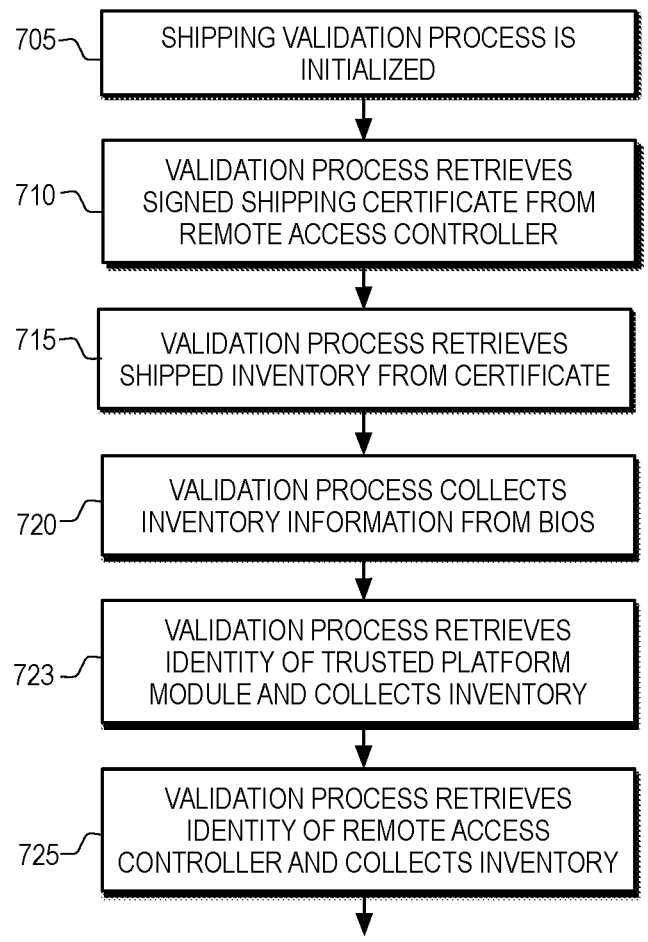
FIG. 7A is a flowchart describing certain steps of an additional method, according to some embodiments, for supporting validation of the IHS as shipped to a customer.
Figure 7B:
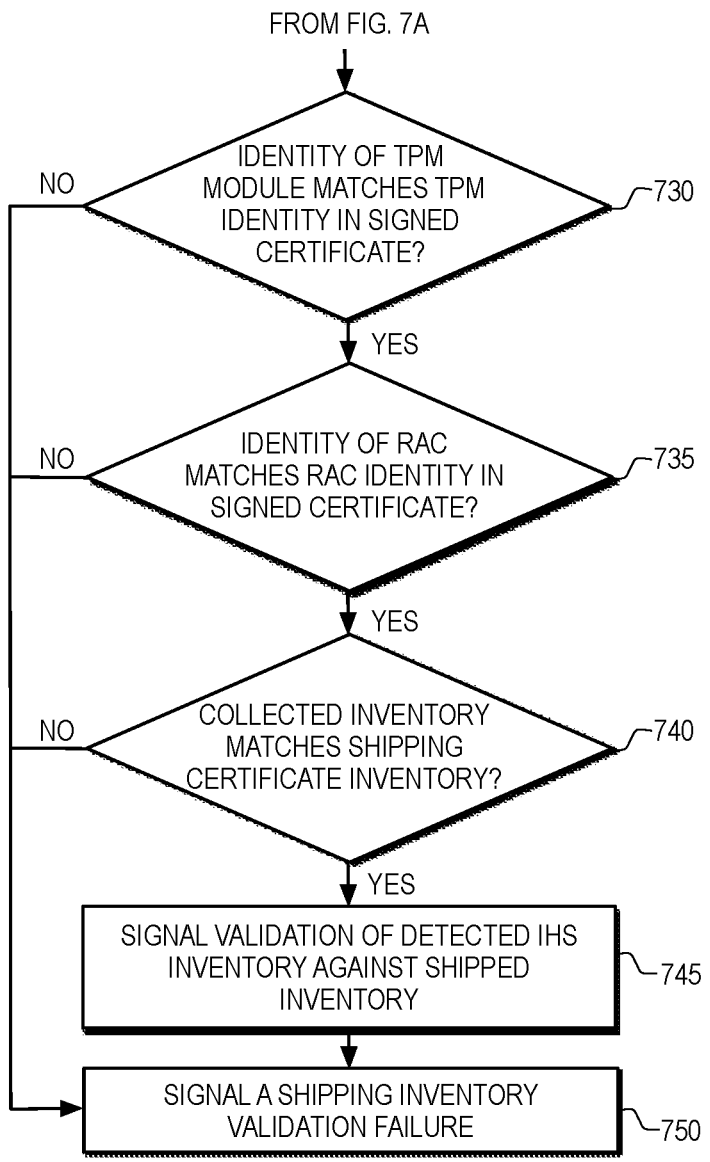
FIG. 7B is a flowchart that is a continuation of the flowchart of FIG. 7A.

Also as indicated in FIG. 5, embodiments may continue, at 565, by initiating validation of the detected hardware of the IHS as genuine hardware that was factory assembled, thus providing assurances the IHS is operating using only factory installed hardware. In some scenarios, the validation mode selector 510 may detect an input from an administrator that requests this hardware validation. In other scenarios, the validation mode selector 510 may initiate this hardware validation automatically, such as based on not detecting any user input for a predefined interval, thus serving as the default validation mode that may be performed each time the IHS is booted. As indicted in FIG. 5, embodiments transition to FIG. 6 for validation of the hardware of the IHS as being genuine factory installed hardware. FIGS. 6 and 7 describe embodiments for use of an inventory certificate in the validation of an IHS as including only genuine hardware components.

FIG. 6 is a swim lane diagram illustrating certain responsibilities of components of an IHS configured according to certain embodiments for use of an inventory certificate in the validation of the hardware components of the IHS as factory installed hardware. FIG. 7 is a flowchart describing certain steps of a method, according to some embodiments, for use of an inventory certificate in the validation of the hardware components of the IHS. At 705 of FIG. 7 and as indicated at 635 of FIG. 6, an inventory certificate validation process 610 is initiated by a validation environment 605 that may include a pre-boot environment, a diagnostic environment or other environment supporting the validation process, such as the validation environment 505 described with regard to validation environment of FIG. 5. In some embodiments, the inventory certificate validation process 610 operates based on validated instructions, such as based on instructions that, when used to calculate a hash value, are confirmed to correspond to a value stored in an immutable memory of the IHS during its factory provisioning. In this manner, the inventory certificate validation process 610 may be added to the root of trust of the IHS.

As indicated at 640 and at 710, the inventory certificate validation process 610 retrieves the signed inventory certificate from the remote access controller 625 or from a persistent memory of the IHS. As described above, the factory provisioning process may include uploading a signed inventory certificate to the remote access controller or to a persistent memory of the IHS. At 705 and at 645, the inventory certificate validation process 610 parses the factory-installed hardware inventory information from the signed inventory certificate. The inventory validation process 610 may confirm the integrity of the inventory information in the inventory certificate by correctly using the inventory information to calculate the hash or other digital signature included in the certificate. Using the public key provided in the signed inventory certificate, the inventory validation process 610 may confirm the authenticity of the signed inventory information that is included in the inventory certificate.

In some scenarios, the inventory certificate validation process 610 may proceed with the inventory validation by collecting an inventory of the detected hardware components of the IHS. In some instances, this collection of inventory information may be initiated earlier by the inventory certificate validation process, such as during initialization of the IHS. At block 720 and as indicated at 650, the inventory certificate validation process 610 may query the BIOS 615 of the IHS for an inventory of hardware components that have been detected by BIOS 615. At block 723 and as indicated at 655, the inventory certificate validation process 610 may retrieve additional hardware inventory information from a Trusted Platform Module (TPM) 620 of the IHS. In some instances, the TPM 620 may identify hardware components that are also identified by BIOS 615. However, in some instances, the TPM 620 may identify certain hardware components, such as secure memory modules, that are not identified by BIOS 615.

As described with regard to FIG. 2, a Trusted Platform Module may serve to establish an initial hardware root of trust in an IHS such that the hardware components within this root of trust operate using validated software instructions. Accordingly, in some embodiments, the inventory certificate validation process 610 may compare identity information for the detected TPM 620 against the TPM identity information that is parsed from the inventory certificate at block 645. In some instances, the detection of any discrepancies between the identity of the TPM specified in the inventory certificate and the identity reported by TPM 620 may result in terminating any further validation procedures.

At block 730, the inventory certificate validation process may confirm the identity of the detected TPM against the identity of the TPM reported in the signed inventory certificate. If the identity of the TPM is successfully validated, validation may continue at block 735. However, if the identity of the TPM is not validated, at block 750, the inventory certificate validation process may signal a core inventory validation failure since any discrepancies between the identity of the factory installed TPM and the TPM that has been detected in the initialized IHS signals a potential compromise in the root of trusted hardware components of the IHS.

At block 735 and as indicated at 660, the inventory certificate validation process 610 may retrieve additional hardware inventory information from a remote access controller 625 of the IHS. As with TPM 620, remote access controller 625 may provide redundant identification of some hardware components and may provide exclusive identification of other hardware components, such as internal memories, management controllers or logic units utilized by the remote access controller 625. Also as with TPM 620, in some embodiments, the inventory certificate validation process 610 may compare identity information for the detected remote access controller 625 against the remote access controller identity information that is parsed from the inventory certificate at block 645. In some instances, the detection of any discrepancies between the identity of the remote access controller specified in inventory certificate and the identity reported by remote access controller 625 may also result in terminating any further validation procedures.

At block 735, the inventory certificate validation process may confirm the identity of the detected remote access controller against the identity of the remote access controller reported in the signed inventory certificate. If the remote access controller is successfully validated, validation may continue at block 740. Otherwise, if the identity of the remote access controller is not validated, at block 750, the inventory certificate validation process may signal a core inventory validation failure. As with the TPM, any discrepancies between the identity of the factory installed remote access controller and the remote access controller detected in the initialized IHS signals a potential compromise of the root of trust of the IHS.

In some embodiments, the inventory certificate validation process 610 retrieves any additional inventory information from any other data sources, such as directly from the processor of the IHS or from a chassis management controller of a chassis in which the IHS has been installed. Upon completion of the collection of the detected hardware components of the initialized IHS, at block 670 and 740, the inventory certificate validation process compares the collected inventory information against the inventory information that is parsed from the signed inventory certificate. For instance, inventory certificate validation process 610 compares identifiers for the detected hardware components of the initialized IHS against the identities of the hardware components that are included in the signed inventory certificate. If the unique identifiers of the detected hardware components of the initialized IHS match the identifiers of the factory installed hardware components from the signed inventory certificate, at block 745 and 675, the inventory certificate validation process 610 signals a successful validation of the detected hardware of the IHS. The customer receiving delivery of the IHS is thus assured that the IHS is operating using only hardware components that were installed at the factory during manufacture of the IHS. If any hardware components are detected that are not identified the inventory of certificate, at block 745, the inventory certificate validation process 610 may signal an inventory validation failure. In some embodiments, an inventory validation failure will also be signaled if the validation process is unable to detect components that are specified in the inventory certificate, such that successful validation requires confirming that an IHS is operating using all of the factory-installed hardware and no additional hardware.

Figure 8:
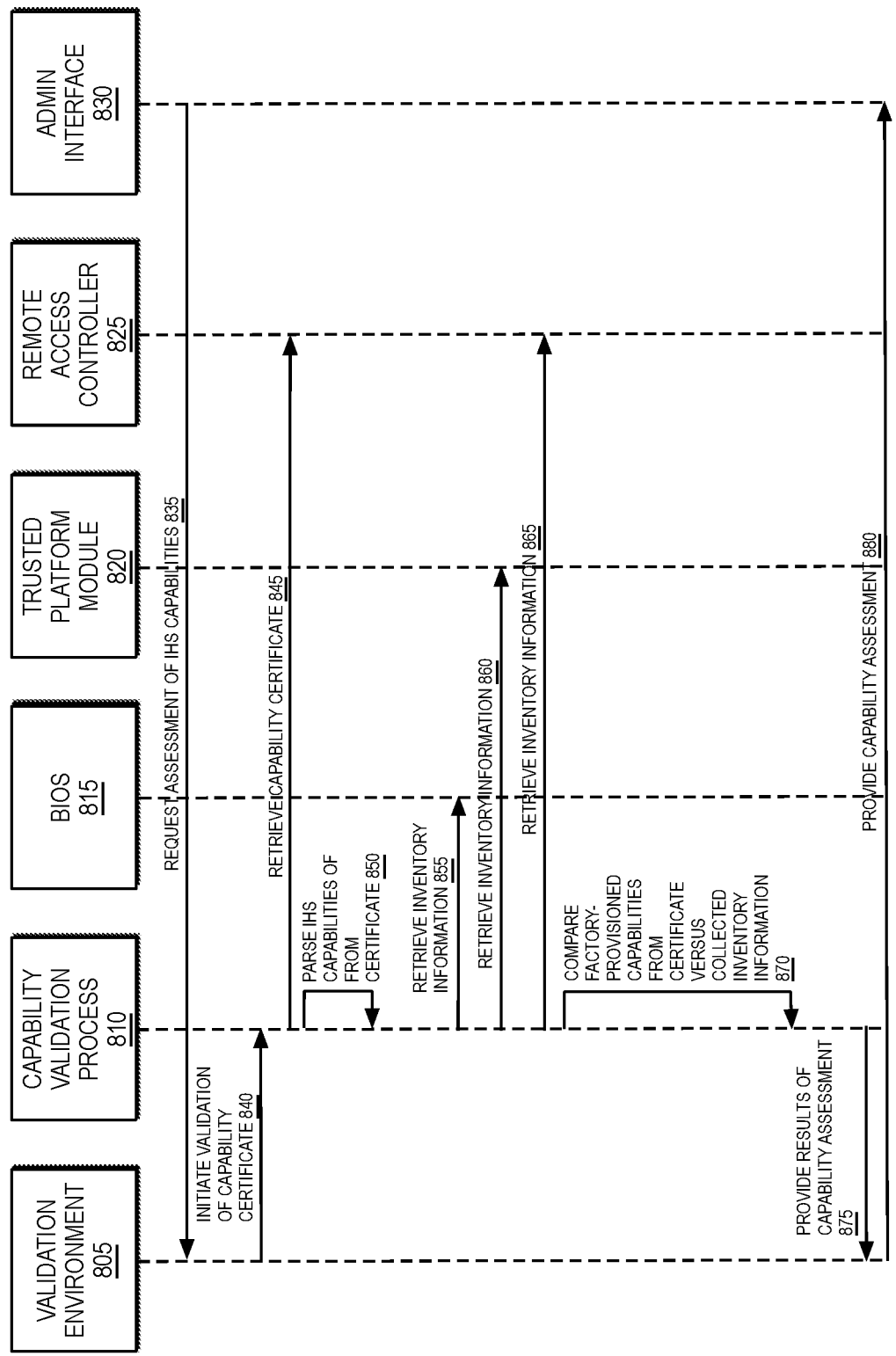
FIG. 8 is a swim lane diagram illustrating certain responsibilities of components of a system configured according to certain embodiments for validation of the factory-provisioned capabilities of an IHS.

As described above, in addition to validating the hardware of an IHS as including only factory-installed hardware, embodiments support validation of the factory-provisioned hardware capabilities of an IHS. As described with regard to FIG. 5, the validation of capabilities of an IHS may be initiated by an administrator via a validation mode selector 510 that is provided within a validation environment 505. FIG. 8 is a swim lane diagram illustrating certain responsibilities of components of a system configured according to certain embodiments for validation of the factory-provisioned capabilities of an IHS.

As indicated in FIG. 8, in some embodiments, the validation of the factory-provisioned hardware capabilities of an IHS may be initiated via a remote administrative interface 830. In some scenarios, at 835, an administrator may utilize a remote management tool, such as a REDFISH interface, to request an assessment of the factory-provisioned hardware capabilities of an IHS. For instance, an administrator may initiate such validations in order to determine whether the IHS is being underutilized relative to its factory-provisioned capabilities. In some instances, these validations may be initiated in order to identify an IHS that can be used to host additional computational tasks, such as to support a data storage system or to support an artificial intelligence application. As indicated in FIG. 8, in some embodiments, such requests from an administrative interface 830 may be received by a pre-boot environment, a diagnostic environment or other validation environment, such as the validation environment 505 of FIG. 5.

Based in inputs from the administrative interface 830 or inputs directly to the validation environment 805, at 840, a capability validation process 810 is initiated by the validation environment 805. In some embodiments, the capability validation process 810 operates based on validated instructions, such as based on instructions that, when used to calculate a hash value, are confirmed to correspond to a value stored in an immutable memory of the IHS during its factory provisioning. In this manner, capability validation process 810 may be added to the root of trust of the IHS.

At 845, the capability validation process 810 retrieves the signed capabilities certificate from the remote access controller 825 or from a persistent memory of the IHS. As described above, the factory provisioning process may include uploading a signed capabilities certificate to the remote access controller or to a persistent memory of the IHS. At 850, the capability validation process 810 parses the factory-provisioned hardware capabilities from the signed capabilities certificate. The capability validation process 810 may confirm the integrity of the capability information in the capabilities certificate by correctly using the capability information to calculate the hash or other digital signature included in the certificate. Using the public key provided in the signed capabilities certificate, the capability validation process 810 may confirm the authenticity of the signed capability information that is included in the capabilities certificate.

This validated capability information provides the factory-provisioned hardware capabilities of the IHS, but does not account for the capabilities of the IHS that are actually in use. As such, the information of the capabilities certificate does not specify which of these capabilities are actually enabled for use by the IHS since the capability certificate specifies all hardware capabilities that can be enabled, regardless of whether they are actually enabled. Accordingly, embodiments may proceed with evaluation of the detected capabilities of the IHS in order to identify the factory-provisioned hardware capabilities that are currently enabled and presumably in use by the IHS.

In some scenarios, the capability validation process 810 may proceed with the capability validation by collecting an inventory of the detected hardware capabilities of the IHS that are currently enabled. In some instances, this collection of capability information may be initiated earlier by the capability validation process, such as during initialization of the IHS. As indicated at 855, the capability validation process 810 may query the BIOS 815 of the IHS for an inventory of hardware capabilities of the IHS that have been detected by BIOS 815 as being enabled and available for use on the IHS. As indicated at 860, the capability validation process 810 may retrieve information identifying additional enabled hardware capabilities from a Trusted Platform Module (TPM) 820 of the IHS. As indicated at 865, the capability validation process 810 may retrieve information identifying additional enabled hardware capabilities from a remote access controller 825 of the IHS. In some embodiments, the capability validation process 810 retrieves any additional inventory information identifying enabled hardware capabilities from other data sources, such as directly from the processor of the IHS or from a chassis management controller of a chassis in which the IHS has been installed.

Upon completion of the collection of the detected enabled hardware capabilities of the IHS, at 870, the capability validation process 810 compares the collected inventory of enabled capabilities against the inventory of all factory-provisioned hardware capabilities of the IHS that are parsed from the signed capabilities certificate. For instance, the capability validation process 810 compares identifiers for the detected hardware capabilities that are enabled against the identities of the factory-provisioned hardware capabilities that are included in the capabilities certificate. If all of the identifiers of the factory-provisioned hardware capabilities are determined to be currently enabled and available for operation on the IHS, at 875 and at 880, the capability validation process 810 signals that all factory-provisioned hardware capabilities of the IHS are currently enabled. The administrator is thus assured that the IHS is operating with all of its factory-provisioned hardware capabilities enabled such that the IHS is not underutilized. The administrator is also thus informed that expansion of the current capabilities of the IHS will required modifications beyond the factory-provisioned capabilities of the IHS.

In many scenarios, however, only a portion of the factory-provisioned hardware capabilities specified in the capabilities certificate will be enabled for operation on the IHS. As described, an IHS may be manufactured and provisioned for a customer such that the IHS includes hardware capabilities that exceed the capabilities requested by the customer. Accordingly, the capability validation process 810 may identify such non-enabled factory-provisioned hardware capabilities of the IHS and may present this information to the administrator, at 875 and 880. As described, the capability validation process 810 may display or populate a user interface with information identifying the non-enabled factory-provisioned hardware capabilities of the IHS that have been detected. Also as described, in some embodiments, the user interface may include capabilities by which the administrator may initiate enabling of one or more of these presently non-enabled capabilities of the IHS.

Figure 9:
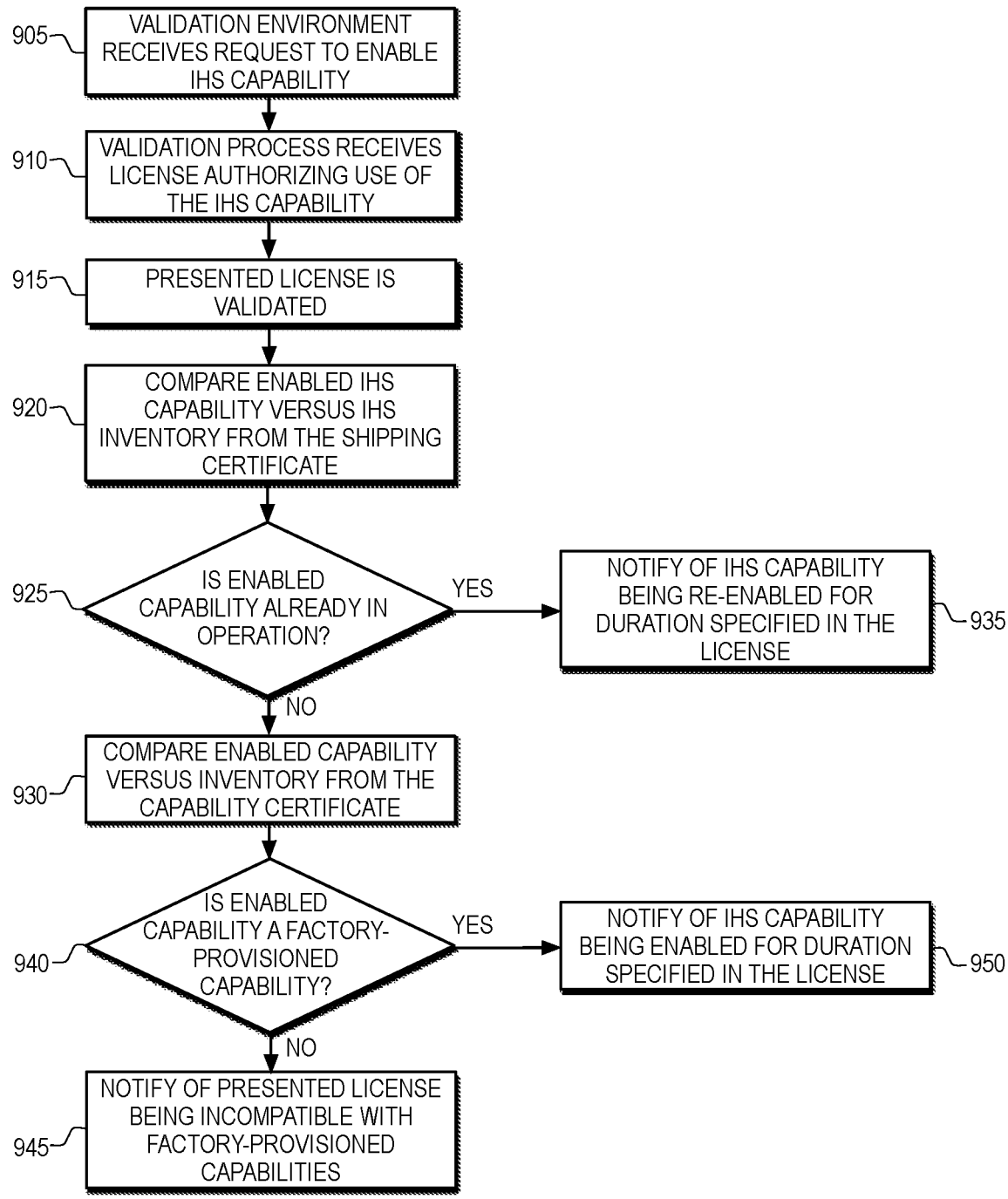
FIG. 9 is a flowchart describing certain steps of an additional method, according to some embodiments, for supporting enabling of factory-provisioned capabilities of an IHS.

Based on such selections, embodiments may transition to FIG. 9 in order to enabled a factory-provisioned hardware capability of the IHS. As described with regard to FIG. 5, an administrator may initiate this capability for enabling capabilities from the generated display of non-enabled capabilities or directly from the validation environment 505, such as upon returning the IHS to service and returning to enable a hardware capability after obtaining a required license. FIG. 9 is a flowchart describing certain steps of an additional method, according to some embodiments, for supporting enabling of factory-provisioned capabilities of an IHS. Embodiments of FIG. 9 may begin, at 905, with the receipt of a request to enable a factory-provisioned hardware capability of the IHS, such as based on an input detected by the validation environment.

In many instances, enabling a factory-provisioned hardware capability requires obtaining a license for operation of the capability. For instance, enabling additional processor cores of an IHS or enabling use of a graphics processor for offloading AI computations requires a license for use of these capabilities. Accordingly, at 910, the validation environment and/or the capability validation process 810 may receive a license that has been presented as authorizing use of a capability that is being enabled. For instance, the administrative interface 830 may be used by an administrator to retrieve and present a license to the validation environment. In other instances, the validation environment may retrieve the license, such as from a remote entitlement management server that may manage licenses available for use by the entity for which the IHS is being operated and managed.

Once the applicable license has been identified, at 915, the presented license may be validated, such as through operations of the remote access controller that confirm the cryptographic credentials associated with license and confirms applicability of the license for use on the IHS, such as ensuring the license corresponds to the entity for which the IHS is being administered. Once the license has been confirmed as valid, at 920, embodiments may continue by determining whether the capability being enabled is already in operation, such that the capability is actually being re-enabled through extension or replacement of an already active license for use of the capability. In scenarios where the license serves to extend use of an already enabled capability of the IHS, at 935, embodiments issue a notification specifying that the capability has been enabled for the duration specified in the received license, thus extending the ongoing use of this capability.

In scenarios where the license does not correspond to an already enabled capability of the IHS, at 930, embodiments may confirm that the license corresponds to a factory-provisioned hardware capability of the IHS, as determined from the capabilities specified in the capabilities certificate. In scenarios where the presented license does not correspond to a factory-provisioned hardware capability of the IHS, at 945, embodiments may issue a notification that the presented license is not compatible with the factory-provisioned hardware capabilities of the IHS. In such scenarios, an administrator may decline to proceed in order to preserve the IHS in this factory provisioned state. In other instances, the administrator may choose to proceed with enabling the capability. In such instances, later validations by the capability validation process 810 of FIG. 8 may identify the enabled capability as not corresponding to the factory-provisioned hardware capabilities of the IHS and may generate a notification that identifies this non-factory provisioned capability that is in use. As indicated in FIG. 9, in scenarios where the capability enabled by the license is a factory-provisioned hardware capability, at 950, embodiments may generate a notification specifying the enablement of the capability for the duration specified in the received license. In this manner, embodiments support validation of enabled capabilities of an IHS as being factory-provisioned hardware capabilities of the IHS.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
one or more processors; and
one or more memory devices coupled to the one or more processors, the one or more memory devices configured with computer-readable instructions stored thereon that, upon execution by the one or more processors, cause a validation process of the IHS to:
 enter a first validation mode that validates detected hardware of the IHS as factory-installed hardware, based, at least in part, on a factory-provisioned inventory certificate configured to identify installed hardware components;
 enter a second validation mode that validates factory-provisioned hardware capabilities of the IHS, based, at least in part, on a factory-provisioned capabilities certificate configured to specify factory-provisioned hardware capabilities and identify non-enabled factory-provisioned hardware capabilities that may be activated by a license validated by cryptographic credentials; and
 enter a third validation mode that enables a first of the non-enabled factory-provisioned hardware capabilities of the IHS, based, at least in part, on the factory-provisioned capabilities certificate.

2. The IHS of claim 1, wherein the validation of the detected hardware of the IHS as factory-installed comprises comparing a plurality of detected hardware components of the IHS against an inventory of factory-installed hardware specified in the factory-provisioned inventory certificate.

3. The IHS of claim 1, wherein the factory-provisioned inventory certificate is stored to a persistent memory of the IHS.

4. The IHS of claim 2, wherein the inventory of factory-installed hardware specified in the factory-provisioned inventory certificate is signed with a private key of a keypair of the IHS to obtain a signed inventory of factory-installed hardware.

5. The IHS of claim 4, wherein the private key of the keypair of the IHS is generated by a remote access controller of the IHS and wherein validation of the signed inventory of factory-installed hardware with a public key of the keypair provides confirmation that the signed inventory of factory-installed hardware was generated by the IHS.

6. The IHS of claim 1, wherein the validation of the factory-provisioned hardware capabilities of the IHS is initiated via a remote administrative interface.

7. The IHS of claim 1, wherein the non-enabled factory-provisioned hardware capabilities of the IHS are identified by comparing capabilities enabled in the detected hardware of the IHS against hardware capabilities specified in the factory-provisioned capabilities certificate.

8. The IHS of claim 1, wherein the factory-provisioned capabilities certificate is stored to a persistent memory of the IHS.

9. The IHS of claim 1, wherein the factory-provisioned hardware capabilities specified in the factory-provisioned capabilities certificate comprise an inventory of hardware capabilities of the IHS that can be licensed for a duration of operation specified in the license.

10. The IHS of claim 1, wherein the third validation mode is configured to evaluate a presented license required for enabling of the first of the factory-provisioned hardware capabilities of the IHS.

11. The IHS of claim 10, wherein the third validation mode detects when the presented license does not correspond to any of the factory-provisioned hardware capabilities, and wherein the third validation mode generates a notification of an attempt to enable a capability of the IHS that is not factory-provisioned.

12. The IHS of claim 1, wherein the first validation mode, second validation mode and the third validation mode are modes of a pre-boot validation environment of the IHS.

13. A method providing multiple validation modes of an IHS (Information Handling System), the method comprising:
    operating a first validation mode that validates detected hardware of the IHS as factory-installed hardware, based, at least in part, on a factory-provisioned inventory certificate configured to identify installed hardware components;
    operating a second validation mode that validates factory-provisioned hardware capabilities of the IHS, based, at least in part, on a factory-provisioned capabilities certificate configured to specify factory-provisioned hardware capabilities and identify non-enabled factory-provisioned hardware capabilities that may be activated by a license, upon validation of the license based, at least in part, on cryptographic credentials; and
    operating a third validation mode that enables a first of the factory-provisioned hardware capabilities of the IHS, based, at least in part, on the factory-provisioned capabilities certificate.

14. The method of claim 13, wherein the validation of the detected hardware of the IHS as factory-installed comprises comparing a plurality of detected hardware components of the IHS against an inventory of factory-installed hardware specified in the factory-provisioned inventory certificate.

15. The method of claim 13, wherein the validation of the factory-provisioned hardware capabilities of the IHS is initiated via a remote administrative interface.

16. The method of claim 13, wherein the non-enabled factory-provisioned hardware capabilities of the IHS are identified by comparing capabilities enabled in the detected hardware of the IHS against hardware capabilities specified in the factory-provisioned capabilities certificate.

17. The method of claim 13, wherein the factory-provisioned hardware capabilities specified in the factory-provisioned capabilities certificate comprise an inventory of hardware capabilities of the IHS that can be licensed for a duration of operation specified in the license.

18. A computer-readable storage device having instructions stored thereon for providing multiple validation modes of an IHS (Information Handling System), wherein execution of the instructions by one or more processors of the IHS causes the one or more processors to:
    operate a first validation mode that validates detected hardware of the IHS as factory-installed hardware, based, at least in part, on a factory-provisioned inventory certificate configured to identify installed hardware components;
    operate a second validation mode that validates factory-provisioned hardware capabilities of the IHS, based, at least in part, on a factory-provisioned capabilities certificate configured to specify factory-provisioned hardware capabilities and identify non-enabled factory-provisioned hardware capabilities that may be activated for a duration of operation specified in a cryptographically validated license; and
    operate a third validation mode that enables a first of the factory-provisioned hardware capabilities of the IHS, based, at least in part, on the factory-provisioned capabilities certificate.

19. The computer-readable storage device of claim 18, wherein the validation of the detected hardware of the IHS as factory-installed comprises comparing a plurality of detected hardware components of the IHS against an inventory of factory-installed hardware specified in the factory-provisioned inventory certificate.

20. The computer-readable storage device of claim 18, wherein the validation of the factory-provisioned hardware capabilities of the IHS is initiated via a remote administrative interface.

* * * * *